United States Patent [19]

McGinnis

[11] Patent Number: 5,224,992
[45] Date of Patent: Jul. 6, 1993

[54] RETARDING SKIN FORMATION ON HOT ASPHALT

[75] Inventor: Edgar L. McGinnis, Moraga, Calif.

[73] Assignee: Chevron Research and Technology Company, San Francisco, Calif.

[21] Appl. No.: 908,202

[22] Filed: Jul. 1, 1992

Related U.S. Application Data

[63] Continuation-in-part of Ser. No. 454,342, Dec. 21, 1989, abandoned.

[51] Int. Cl.$^5$ .............................................. C08L 95/00
[52] U.S. Cl. .................................................. 106/284.3
[58] Field of Search ....................... 106/284.3; 556/95

[56] References Cited

U.S. PATENT DOCUMENTS 2,997,485  8/1961  Kuivila et al. .......................... 556/95
3,956,001  5/1976  Pitchford ............................. 106/273

FOREIGN PATENT DOCUMENTS 83802  8/1971  Fed. Rep. of Germany .

*Primary Examiner*—David Brunsman
*Attorney, Agent, or Firm*—W. K. Turner; J. J. DeYoung

[57] ABSTRACT

Organotin hydrides are effective in retarding oxidative skin formation in asphalts maintained at elevated temperature.

12 Claims, No Drawings

RETARDING SKIN FORMATION ON HOT ASPHALT

CROSS REFERENCE TO RELATED APPLICATIONS

This application is a continuation-in-part of U.S. Pat. Ser. No. 454,342 filed Dec.21, 1989, now abandoned, the entire disclosure of which is incorporated herein by reference.

BACKGROUND OF THE INVENTION

1. Field of the Invention

The present invention relates to a method of inhibiting oxidative skin formation in hot asphalt compositions. This invention also relates to asphalt compositions which are resistant to oxidative skin formation at elevated temperatures.

2. Description of the Prior Art

Many asphalts surface-harden to form a "skin" on their surface when maintained at elevated temperatures, e.g., molten, for extended periods of time. For example, typical asphalt shingle manufacturers maintain asphalt in storage at elevated temperatures in a holding tank to be used in the manufacture of shingles. These asphalts can develop a tough, insoluble surface layer or "skin" when maintained at these high temperatures. This skin is not useful and is, in fact, detrimental to the shingle manufacturer since it cannot be used to make shingles. Not only does this useless skin represent a loss of useful asphalt to the manufacturer, it also presents manufacturing problems. For instance, the skin accumulates in the holding tank and eventually must be removed. This interferes with the shingle production by taking the holding tank out of operation until it is cleaned.

U.S. Pat. No. 3,956,001, issued May 11, 1976 to Pitchford, discloses that surface hardening or skin of asphalt can be inhibited by: (1) maintaining an inert atmosphere above the asphalt during storage, (2) lower the storage temperature to a maximum of 135° C. (275° F.), (3) continuously agitating the asphalt within the storage vessel or (4) adding to the asphalt dodecylphenoxypoly(ethyleneoxy)ethanol; calcium petroleum sulfonate; 2,6-ditertiarybutyl-p-phenol; or 2,6-ditertiarybutyl-p-phenol in combination with stearic acid. However, it is quite often not practical to employ some of these methods (such as the use of an inert atmosphere) and others (such as agitation) represent increased cost to the manufacturer in terms of energy consumption.

German Patent No. 83802, issued Aug. 12, 1971 relates to the use of various additives to inhibit embrittlement of bituminous materials which takes place during hot storage. This reference teaches that embrittlement is caused by asphaltene formation. Asphaltenes are by definition not soluble in alkanes and soluble in benzene, toluene or similar aromatics. In contrast asphalt skin is insoluble in benzene, toluene or similar aromatics. Among the compounds disclosed to inhibit embrittlement are organic phosphites, organic acids and their derivatives, phenols, organotin compounds and benzophenone, preferably tris-nonylphenyl phosphite, stearic acid butyl ester, epoxidized butyl esters of oleic acid, lauric acid, stearic acid, nonylphenyl, dibutyl-[tin-bis-di(thioacetic acid octyl ester)] and 2-hydroxy-4-methoxybenzophenone. There is no disclosure in the reference of organotin hydrides.

It has now been discovered that oxidative skin formation in asphalts at elevated temperatures can be retarded by incorporating into the asphalt an organotin hydride.

SUMMARY OF THE INVENTION

In accordance with the present invention, there is provided a method for inhibiting oxidative skin formation of asphalt at elevated temperatures, said method comprising incorporating into the asphalt an organotin hydride in an amount, based on tin, of about 10 ppm to about 1000 ppm of the asphalt alone.

There is also provided in accordance with this invention, an asphalt composition which is resistant to oxidative skin formation at elevated temperatures comprising asphalt and an organotin hydride in an amount, based on tin, of about 10 ppm to about 1,000 ppm of the asphalt alone.

DETAILED DESCRIPTION OF PREFERRED EMBODIMENTS

The compositions of the present invention contain asphalt and an amount of an organotin hydride sufficient to retard or inhibit oxidative "skinning" of the asphalt at elevated temperatures, i.e., at about 300° F. to about 600° F., preferably 350° F. to 530° F., and still more preferably 400° F. to 530° F. for roofing asphalts. Any asphalt may be employed, including those commonly used in industrial, e.g., roofing, applications as well as those commonly employed in paving applications. Typically, asphalts used in industrial applications are heated to temperatures on the order of 500° F. during the manufacture of, e.g., roofing materials. At these high temperatures, skinning can become a severe problem. Typical paving compositions require that the asphalt be shipped at about 300°-325° F. and blended with the paving aggregate at about 270°-300° F. At these lower temperatures, skinning is not as severe a problem (and in some cases may not occur at all) as at the higher temperatures used in industrial applications, though skinning can occur via localized overheating when mixing with the aggregate. In any event, since the compositions of this invention are resistant to oxidative skinning, paving materials made from them do have the advantage of being resistant to viscosity increase and ductility loss caused by hot mix processing or in-place aging.

The organotin hydrides useful in the present invention include, but are not limited to, mono-, di- and triaryltin hydrides (such as mono-, di- and triphenyltin hydride) and mono-, di- and trialkyltin hydrides (such as mono-, di- and tributyltin hydride). The aryl and alkyl groups on these compounds may be unsubstituted or may be substituted with moieties other than hydrocarbyl groups, the only requirement being that these moieties not interfere with the oxidative skin formation retarding properties of the composition.

The amount of organotin hydride employed may vary considerably depending on several factors, including the type of asphalt, the temperature to which the asphalt will be heated, the conditions under which the asphalt will be maintained at elevated temperature, and the particular organotin hydride(s) used. In general, however, the organotin hydride is employed in an amount, based on tin, of about 10 ppm to about 1,000 ppm, preferably about 200 to about 300 ppm, of the asphalt alone. In other words, an amount of organotin hydride is added to the asphalt such that the resulting composition contains from about 10 ppm to about 1,000 ppm of tin based on the amount of asphalt in the composition.

As used herein, the term "skin" means an insoluble carbonaceous material formed on the surface of asphalt at an elevated temperature. By insoluble it is meant insoluble in aromatic hydrocarbons, e.g. benzene, toluene, xylene, and the like; chlorinated hydrocarbons such as methylene dichloride, chloroform, and trichloroethylene, and the like; and carbon disulfide.

As used herein, the terms "retard" and "inhibit" mean that oxidative skin formation in the asphalt compositions of this invention is reduced and/or delayed (but perhaps not prevented altogether) compared to asphalt compositions which contain no additive for reducing oxidative hardening or skin formation.

The method of the present invention is practiced, and the compositions of this invention are made, by simply adding the desired amount of organotin hydride to the asphalt in any convenient manner. For example, the organotin hydride may be dispersed throughout the asphalt by conventional means, such as mechanical agitation, when the asphalt is in a molten state.

EXAMPLE 1

Two samples of asphalt were heated to about 500° F. and maintained at that temperature for about 1½ hours under a nitrogen blanket. One sample contained no additive while the other contained 207 ppm, based on tin, of an organotin hydride (triphenyltin hydride). The amount of oxidative skin formation was determined for each sample by filtering it through a sieve (200 mesh) and weighing the collected skin. The results are indicated below in Table I.

TABLE I

| | Untreated Asphalt[1] | | | Treated Asphalt[2] | | |
|---|---|---|---|---|---|---|
| Time at 500° F. (Hrs) | ½ | 1 | 1½ | ½ | 1 | 1½ |
| Skin. W't % | 0.24 | 0.48 | 0.60 | 0.09 | 0.19 | 0.31 |

[1] Both samples were Maya-Boscan (70%, 30%, respectively) asphalt prepared by air-blowing and ferric chloride catalysis (0.35%).
[2] Contained 207 ppm tin from triphenyltin hydride.

As can be seen from the data in Table I, the organotin hydride was very effective in preventing or retarding skin formation.

It has also been quite surprisingly found that several other tin-containing materials do not retard asphalt skin formation, and/or have serious drawbacks which limit their utility in this field. For example, tin metal and alkyltin carboxylates do not retard skin formation and, while dibutyltin dichloride and stannic chloride do provide some resistance to surface hardening of the asphalt, their addition to the hot asphalt causes the undesirable evolution of HCl.

What is claimed is:

1. A method for inhibiting oxidative skin formation of asphalt at elevated temperatures, said method comprising incorporating into the asphalt an organotin hydride in an amount, based on tin, from about 10 ppm to about 1000 ppm of the asphalt alone.

2. The method of claim 1 wherein the organotin hydride comprises a triaryltin hydride.

3. The method of claim 2 wherein the triaryltin hydride is triphenyltin hydride.

4. The method of claim 1 wherein the organotin hydride comprises a trialkyltin hydride.

5. The method of claim 4 wherein the trialkyltin hydride is tributyltin hydride.

6. The method of claim 1 wherein the asphalt comprises air-blown asphalt.

7. An asphalt composition which is resistant to oxidative skin formation at elevated temperatures comprising asphalt and an organotin hydride in an amount, based on tin, from about 10 ppm to about 1000 ppm of the asphalt alone.

8. The composition of claim 7 wherein the organotin hydride is a triaryltin hydride.

9. The composition of claim 8 wherein the triaryltin hydride is triphenyltin hydride.

10. The composition of claim 7 wherein the organotin hydride is a trialkyltin hydride.

11. The composition of claim 10 wherein the trialkyltin hydride is tributyltin hydride.

12. The composition of claim 7 wherein the asphalt comprises air-blown asphalt.

* * * * *